Dec. 6, 1938.  C. A. JESSOP  2,139,590
BOLT OR NUT LOCK
Filed Nov. 25, 1935   2 Sheets-Sheet 1
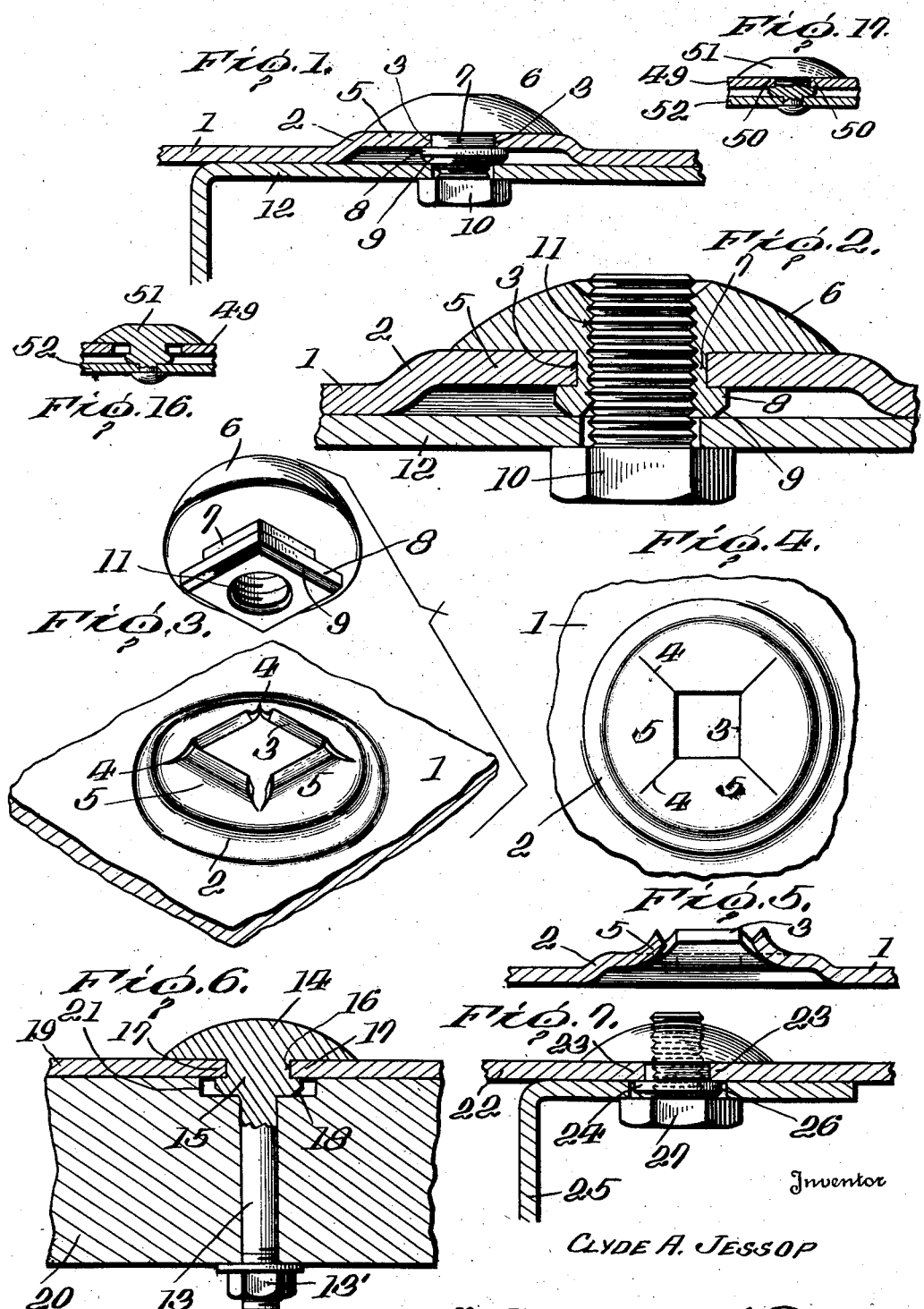
Inventor
CLYDE A. JESSOP
By Patterson Wright Patterson
Attorneys Dec. 6, 1938.   C. A. JESSOP   2,139,590
BOLT OR NUT LOCK
Filed Nov. 25, 1935   2 Sheets-Sheet 2
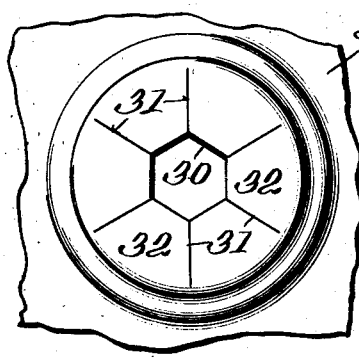
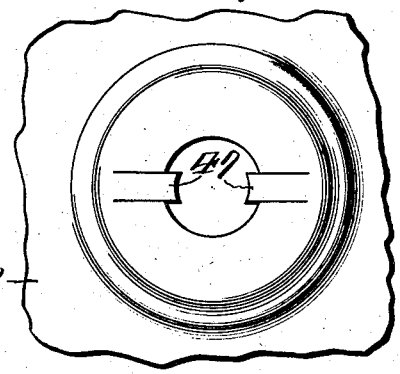
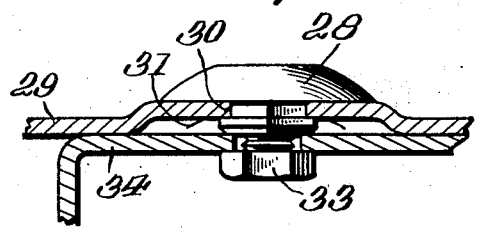
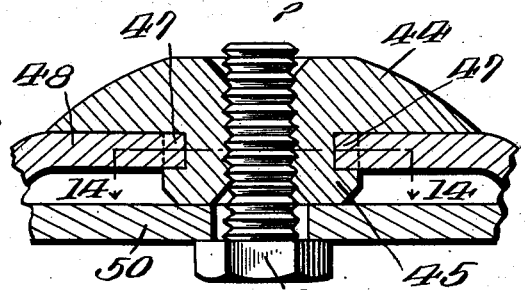
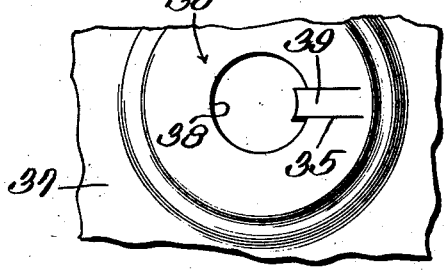
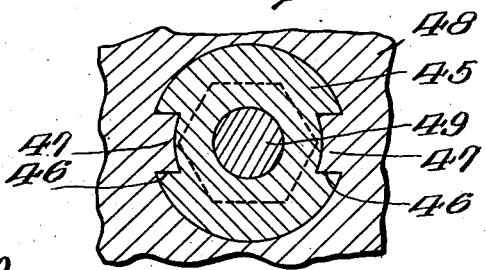
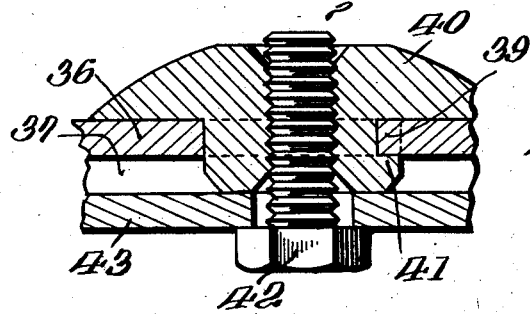
Inventor
CLYDE A. JESSOP
Attorneys Patented Dec. 6, 1938

2,139,590

UNITED STATES PATENT OFFICE 2,139,590

BOLT OR NUT LOCK

Clyde A. Jessop, Swartz Creek, Mich.

Application November 25, 1935, Serial No. 51,516

6 Claims. (Cl. 151—32)

This invention relates to certain new and useful improvements in a bolt or nut lock especially adapted to be used in automobile body construction, the object being to provide means for not only preventing the bolt or nut from turning but for preventing the same from rattling.

Another object of my invention is to provide a bolt or nut lock which is exceedingly simple and cheap in construction, the material to be fastened being struck up to form locking members which are drawn into receiving grooves of the bolt or nut when the two are drawn tightly together in order to fasten the members together.

Other and further objects and advantages of the invention will be hereinafter set forth and the novel features thereof defined by the appended claims.

In the drawings,

Figure 1 is a vertical section through two members to be fastened showing the application of a nut lock;

Figure 2 is a vertical section through the same showing the nut in section and the bolt in elevation;

Figure 3 is a perspective view of a nut constructed in accordance with the disclosure of Figures 1 and 2;

Figure 4 is a top plan view of a portion of the material before it is struck up;

Figure 5 is a section through the same showing the tongues struck up by suitable die;

Figure 6 is a section through a modified form of bolt lock;

Figure 7 is a detail section of a modified form of nut lock;

Figure 8 is a top plan view of a portion of material constructed with a hexagon opening to form a plurality of locking members;

Figure 9 is a section showing a bolt locked by this construction;

Figure 10 is a plan view of still another modified form of locking tongue struck up from the material;

Figure 11 is a section showing this form of tongue used to lock a nut;

Figure 12 is a top plan view of still another form of tongue struck up from the material;

Figure 13 is a section showing the application of this form of locking member to a nut;

Figure 14 is a section taken on line 14—14 of Figure 13;

Figure 15 is a detail section showing the outer disposed tongue struck up from the material;

Figure 16 is a detail section of a modified form of lock in which a rivet is used instead of a bolt and the head is provided with a neck portion having a groove; and Figure 17 is a section taken at right angles to Figure 16.

In the form of nut lock as disclosed in Figures 1, 2, 3 and 4, the material 1 is provided with a boss 2 in which is formed a square opening 3 from the corners of which radiate slots 4, the portions between the slots forming tongues 5 which are adapted to be struck up as shown in Figure 5 by a suitable die.

A nut 6 has a neck portion 7 rectangular in cross section corresponding to the opening 3, which terminates in an enlarged portion 8 beveled as shown at 9 which forms an annular groove in which the tongues 5 are adapted to be forced when drawn together by a bolt 10 which is adapted to work in the threaded bore 11 of the nut in order to secure the material 1 to member 12.

With the tongues struck up in the position shown in Figure 5, the enlarged portion 8 of the nut 6 with its beveled edge is forced between the tongues and the bolt 10 screwed into the bore of the nut and as the two pieces of material 1 and 12 are drawn together, the tongues are forced tightly into the annular groove in order to lock the nut not only from turning but also to prevent it from rattling as the struck up portions are brought tightly into engagement with the walls of the groove of the nut in order to securely fasten the same.

In the form of Figure 6 I show a bolt 13 with a head 14 having its stem adjacent the head enlarged as shown at 15 to provide an annular groove 16 into which the tongues 17 are adapted to be forced, the enlargement 15 being beveled as shown at 18 in order to allow it to be forced between the tongues. In this construction, the material 19 in which the tongues are formed is not embossed but the member 20 to which the material is adapted to be secured is provided with a recess 21 to receive the enlargement 15 so that when the nut 13' of the bolt is screwed into position so as to clamp the members 19 and 20 together, the tongues will be forced into the groove formed by the enlargement 15 in order to lock the head of the bolt.

In Figure 7 the material 22 is not embossed but is provided with tongues 23 which are forced into a groove formed by an enlargement 24 of a shank and the material 25 is provided with an opening 26 to receive the enlargement 24 and when the bolt 27 is screwed into the bore of the nut so as to clamp the members 22 and 25 together, the tongues will be forced into the grooves formed on the nut by the enlargement, which enlargement is provided with a beveled face in order to allow it to pass through the tongues struck up from the material 22 in a similar manner as employed for fastening the head of the bolt as shown in Figure 6.

Figures 6 and 7 disclose a construction in which it is not necessary to emboss the material from which the tongues are formed as the material to which it is to be secured is provided with an opening to receive the enlargement forming the groove in which the tongues are forced.

In Figures 8 and 9 I show a construction in which the nut 28 is provided with a shank hexagon in cross section to form a groove and the material 29 is embossed and is provided with a hexagon shaped opening 30 from the corners of which radiate slots 31 which are bent upwardly to form locking tongues 32 which are forced into the groove of the nut by the bolt 33 when screwed therein to draw the material 29 tightly against the member 34 to be fastened. This provides a modified form of locking means which will prevent the nut from turning and also from rattling.

In Figures 10 and 11 I show still another modified form of locking tongue or a nut, the tongue being formed by parallel slits 35 formed in the embossed portion 36 of the material 37, the same being provided with an opening 38. The tongue 39 formed by the parallel slits is adapted to be bent outwardly and the nut 40 is provided with a groove 41 corresponding in shape to the tongue 39 into which it is drawn by the bolt 42 in order to fasten the material 37 to the member 43. In this form the nut 40 is preferably provided with a circular shank, the end of which is tapered as shown in order to allow it to be forced by the tongue.

In Figures 13, 14 and 15 the nut 44 is provided with a shank 45 with oppositely disposed grooves 46 into which the tongues 47 of the embosed portion of the material 48 are adapted to be forced when the bolt 49 is screwed in position in order to clamp the material 48 to the member 50. This provides a pair of oppositely disposed locking tongues 47 which are struck up in a similar manner to that disclosed in the preferred embodiment of my invention and the end of the shank of the bolt is beveled in order to allow it to be forced between the tongues, the tongues dropping into the slots and when the bolt is in position it is screwed into the nut in order to draw the material 48 in contact with the member 50. The tongues are forced into the grooves as shown in Figure 14 so as to prevent the nut from turning and also to prevent the same from rattling.

In the embodiment of my invention as shown in Figures 16 and 17, a piece of material 49 is provided with an oblong shaped opening, the walls of which are split to form tongues 50, and a rivet 51 having a neck portion grooved and extending through the opening is adapted to be engaged by the tongues 50, said rivet passing through the member 52 and having its head turned or swedged so as to fasten the two pieces of material together.

This provides a construction in which a rivet can be used instead of a bolt and by having an oblong opening in the material from which the tongues are struck up, I provide means for allowing the rivet to move whereby any out of alignment of the opening of the member to be connected will be compensated for and a construction provided wherein the rivet or bolt can move in one direction and yet be held by the tongue to prevent it from turning.

While I have failed to show the preferred embodiment of my invention loosely locked in position within the member by tongues struck up therefrom, it is of course, understood that the embodiment of my invention as shown in Figures 16 and 17 can be used with a bolt or nut and that the rivet construction as disclosed in these figures could be substituted for any of the other embodiments of my invention and therefore I do not wish to limit myself to the use of any particular kind of member so long as it is provided with a neck portion having a groove to receive tongues which are forced therein as the members are secured together, either by a bolt or rivet.

In all the embodiments of my invention as herein shown, the material is formed with locking tongues and either the bolt or the nut is provided with grooves to receive the locking tongues which are forced into position as the material is fastened to a support or member and while I have shown certain shapes of tongues, bolts and nuts, I do not wish to limit myself to these shapes as I am fully aware that the shape of the nut or bolt can be changed without departing from the spirit of my invention.

While in the drawings I have failed to illustrate a bolt arranged within an embossed piece of material, it will be apparent that a bolt with a head constructed with a groove to receive the material in a similar manner as the nut can be constructed in accordance with the disclosure without departing from the spirit of my invention and therefore I do not wish to limit myself to the locking of a nut or the locking of a bolt or the particular construction of tongue used for such purpose so long as the material to be fastened is bendable to provide a tongue which will be forced into a locking groove when the material is fastened to some other piece of material or support.

What I claim is:

1. In a device of the kind described, the combination with a piece of malleable material having an opening formed therethrough with the walls of the opening split and bent upwardly to form tongues, a headed threaded member provided with a neck portion enlarged to form an annular groove at the underside of the head adapted to be forced through the opening in said material and a threaded member cooperating with the first member by means of a second piece of material for forcing the upturned portions of said first material into a plane with one another within said groove for clamping the same therein.

2. In a device of the kind described, the combination with a piece of material having an embossed portion with an opening having the walls split and struck upwardly therefrom to form tongues, a headed threaded member having a neck portion enlarged to form a groove, one wall of the groove being flush with the under side of the head, the end of said member portion being beveled and being adapted to be forced through the struck up portion of said material and a threaded member cooperating with the first member for forcing the struck up portion of said material into said groove when said members are drawn together to prevent one of said members from turning in respect to the other.

3. In a device of the kind described, the combination with two pieces of material adapted to be secured together, one of said pieces being provided with an opening from which slits radiate to form tongues which are adapted to be bent outwardly, the other piece of material being provided with an opening having a greater area than the opening in the first piece of material, a headed threaded member having a neck enlarged to form a groove, one wall of the groove being flush with the under side of the head adapted to be forced through the first piece of material and provided with a groove capable of receiving the portion struck up from the first piece of material and a threaded member cooperating with the first mentioned member for drawing said pieces of material together to force the tongues of the first piece of material into a plane with one another within the groove of the first mentioned member to prevent one of said members from turning in respect to the other.

4. In a device of the kind described, the combination with a piece of material embossed and provided with an opening from which radiate slits to form a plurality of tongues adapted to be bent outwardly, a headed nut having a neck portion corresponding in shape to the opening in the first material and having an enlarged portion beveled to allow it to be forced between the tongues, the enlarged portion forming an annular groove in the neck, one wall of the groove being flush with the under face of the head and a threaded bolt working in the threaded portion of said nut for drawing the tongues of the first material into the groove of the nut when said members are drawn together to prevent one of said members from turning in respect to the other.

5. In a device of the kind described, the combination with a piece of material having an embossed portion with a rectangular opening formed therethrough from which radiate slits to form a plurality of tongues which are bent outwardly, of a headed member provided with a neck rectangular in cross section corresponding to the shape of the opening in said material and having an enlarged beveled end to facilitate it to be forced between the outwardly projecting tongues and a bolt working in said member acting directly upon a second piece of material for forcing said tongues into a plane with one another within the groove to permanently secure said member therein.

6. In a device of the kind described, the combination with a piece of malleable material having an opening the walls of which are provided with slits and distorted to form outwardly extending tongues, of a pair of headed members for clamping said material to a support, one of said headed members being provided with a neck portion having a groove, one wall of which is flush with the under side of the head, said tongues being bent into said groove and clamping said material to said support when said headed members are moved towards one another to prevent one of said members from turning in respect to the other.

CLYDE A. JESSOP.